United States Patent [19]

Youngkeit

[11] Patent Number: 5,032,016
[45] Date of Patent: Jul. 16, 1991

[54] RADIATION GATHERING REFLECTOR AND METHOD OF MANUFACTURE

[75] Inventor: Dean C. Youngkeit, Willard, Utah

[73] Assignee: Thiokol Corporation, Ogden, Utah

[21] Appl. No.: 386,387

[22] Filed: Jul. 27, 1989

Related U.S. Application Data

[62] Division of Ser. No. 6,518, Jan. 23, 1987, Pat. No. 4,881,998.

[51] Int. Cl.$^5$ .............................. G02B 5/08; F24J 2/10
[52] U.S. Cl. ..................................... 350/613; 126/438
[58] Field of Search ................... 350/613, 641, 614; 343/897, 912, 781 P, 840, 915; 156/173, 175; 126/438, 417, 419

[56] References Cited

U.S. PATENT DOCUMENTS

| | | | |
|---|---|---|---|
| 3,083,864 | 4/1963 | Young | 220/83 |
| 4,092,453 | 5/1978 | Jonda | 343/912 |
| 4,239,344 | 12/1980 | Wildenrotter | 350/641 |
| 4,635,071 | 1/1987 | Gounder et al. | 343/897 |
| 4,743,095 | 5/1988 | Dane | 350/614 |
| 4,764,779 | 8/1988 | Sato et al. | 343/915 |
| 4,947,825 | 8/1990 | Moriarty | 126/438 |

Primary Examiner—Rodney B. Bovernick
Assistant Examiner—James Phan
Attorney, Agent, or Firm—Hodgson, Russ, Andrews, Woods & Goodyear

[57] ABSTRACT

A radiation gathering reflector and a method of making a radiation gathering reflector. Resin impregnated fibrous material is wound onto a mandrel which has a pair of opposing surfaces of revolution each of which has a shape corresponding to a predetermined shape of the inner reflector surface, and the resin is allowed to polymerize to form a composite which includes two integrally connected structural support members. An equatorial cut is formed in the composite to separate the support members from each other and from the mandrel. Then, a reflective surface is formed on the inner surface of at least one of the separated support members for gathering radiation. Alternatively, the reflective surface is formed on the surface of the mandrel and the resin impregnated fibrous material is wound onto the reflective surface and allowed to polymerize to form the composite. The forming of the radiation gathering reflector by a polar winding process such that a greater mass of material is located at the center portion is preferred to provide increased structural support at the center portion for attachment of radiation absorbing components so that the support member may have a thin edge portion and therefore require less material, be inexpensive, and be of lighter weight. Such a radiation gathering reflector also preferably includes a plurality of strengthening ribs which extend between the center portion and the edge portion and which cross each other in diamond-shaped configurations to provide increased strength and stiffness to the reflector support member.

20 Claims, 2 Drawing Sheets

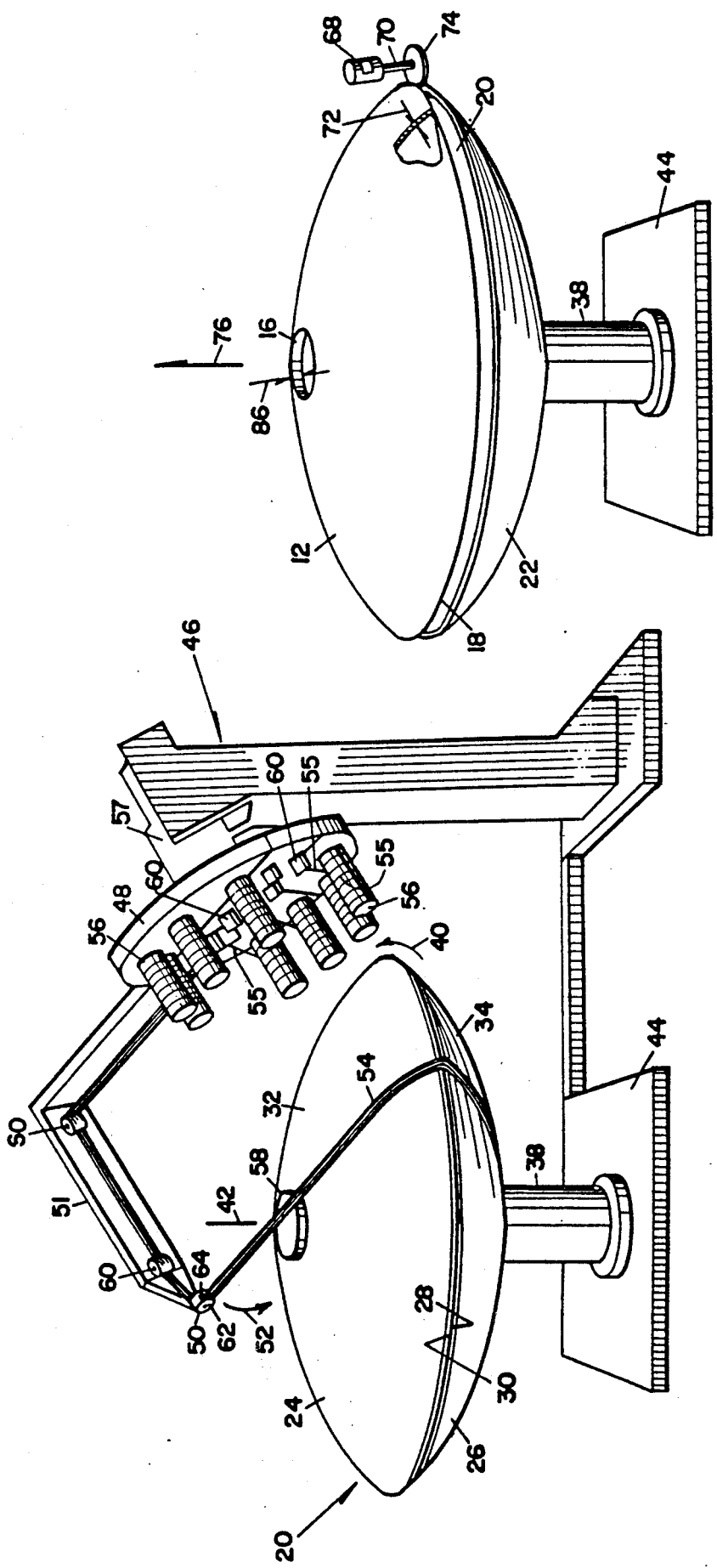

RADIATION GATHERING REFLECTOR AND METHOD OF MANUFACTURE

This is a divisional of co-pending application Ser. No. 006,518, filed on Jan 23, 1987, now U.S. Pat No. 4,881,998.

The present invention is related to reflectors. More particularly, the present invention is related to radiation gathering reflectors having smooth reflective surfaces such as parabolic dishes for gathering and concentrating solar power and for microwave antennas, radio telescopes, and the like, or for trough or channel type reflectors. Such reflectors are usually paraboloid in form so that the gathered radiation can be focused to a point when the source of radiation such as the sun or an earth satellite is distant.

The manufacture of a reflector by the molding of a plastic or moldable substance onto a form of complimentary shape, removing the molded substance when it has set or hardened, and then coating the surface thereof with a metallic reflecting material, such as disclosed in U.S. Pat. No. 1,461,301 to Wiskott, would be an expensive labor intensive process and would undesirably require a high weight to strength ratio thereby resulting in increased expense for the additional moldable material needed to provide the minimum strength and stiffness required. The high weight and cost problem is compounded by low dimensional stability.

Filament winding of vessels or compound curved shells is disclosed in U.S. Pat. No. 3,047,191 to Young and U.S. Pat. No. 3,386,872 to Medney. Medney discloses a cumbersome process of winding a layer of resin coated glass fibers over a quilted polyethylene bag which has been positioned over a multidiameter mandrel, then wrapping a band of adhesively coated nylon cloth circumferentially about the midpoint of the bag, then circumferentially cutting the cloth, bag, and windings after the adhesive has set, then removing the resulting shells and bag portions from the mandrel and placing each shell and bag portion on a second shaped mandrel having a mold release agent coated thereon and freezing the assemblage, then removing the frozen winding and bag portion from the mandrel, then taking the bag portion out of the winding and replacing the winding on the second mandrel which has again been coated with a mold release agent, and finally curing the resin. This is undoubtedly a labor intensive expensive process and one which does not lend itself to providing the smooth surfaces required for radiation gathering reflectors since the layer of fibers is wound over a quilted bag. Indeed, Medney is directed to the manufacture of curved shells such as radomes which do not require such smooth reflective surfaces.

Young discloses a method of producing vessels such as pressure vessels. The mandrel therefor is normally made of disposable material so that it can be removed through the end fittings once the vessel is completed. The end fittings are positioned on the mandrel at the ends of the vessel access before the winding starts, and the helical windings are applied over the flanges of the end fittings. Young alternatively discloses that the mandrel may be made of material intended to remain within the vessel as a liner therefor. Young also suggests that the winding may be applied in such a manner as to generate a series of crossovers leaving diamond shaped openings in the vessel wall, and that circular windings may be applied around the body passing through the crossover points for girth strengthening. Such filament winding as disclosed in Young is not suitable on a mandrel in the shape of a single radiation gathering reflector.

In the fabrication by polar winding on a generally cylindrical mandrel of laminate or panels such as wings and stabilizers for aircraft wherein, after the mandrel has been wound, the panels are sliced from the cylindrical surface such disclosed in U.S. Pat. No. 4,401,495 to McKinney, the mass of composite material at the polar axis and along each end surface of the cylindrical mandrel is discarded while the mass of composite material on the cylindrical surface is used.

It is an object of the present invention to provide a method of manufacturing a radiation gathering reflector which is dimensionally stable yet of light weight.

It is another object of the present invention to provide a low cost and minimum waste fabrication method for a radiation gathering reflector.

It is a still further object of the present invention to provide a reflector manufacturing method which is not labor intensive but instead lends itself to automated techniques.

It is yet another object of the present invention to provide a radiation gathering reflector which is rugged yet reliable.

It is a further object of the present invention to provide a radiation gathering reflector which is easily repairable.

It is a still further object of the present invention to provide a radiation gathering reflector wherein a minimum amount of material is used to provide the necessary strength.

The above and other objects, features, and advantages of this invention will be apparent in the following detailed description of the preferred embodiments thereof which is to be read in connection with the accompanying drawings.

IN THE DRAWINGS

FIG. 2 is a perspective view illustrating filament winding of a mandrel in accordance with the present invention;

FIG. 3 is a perspective view illustrating the forming of an equatorial cut in the composite formed by the filament winding illustrated in FIG. 2 in accordance with the present invention;

DETAILED DESCRIPTION OF THE PREFERRED EMBODIMENTS

Figure 1:
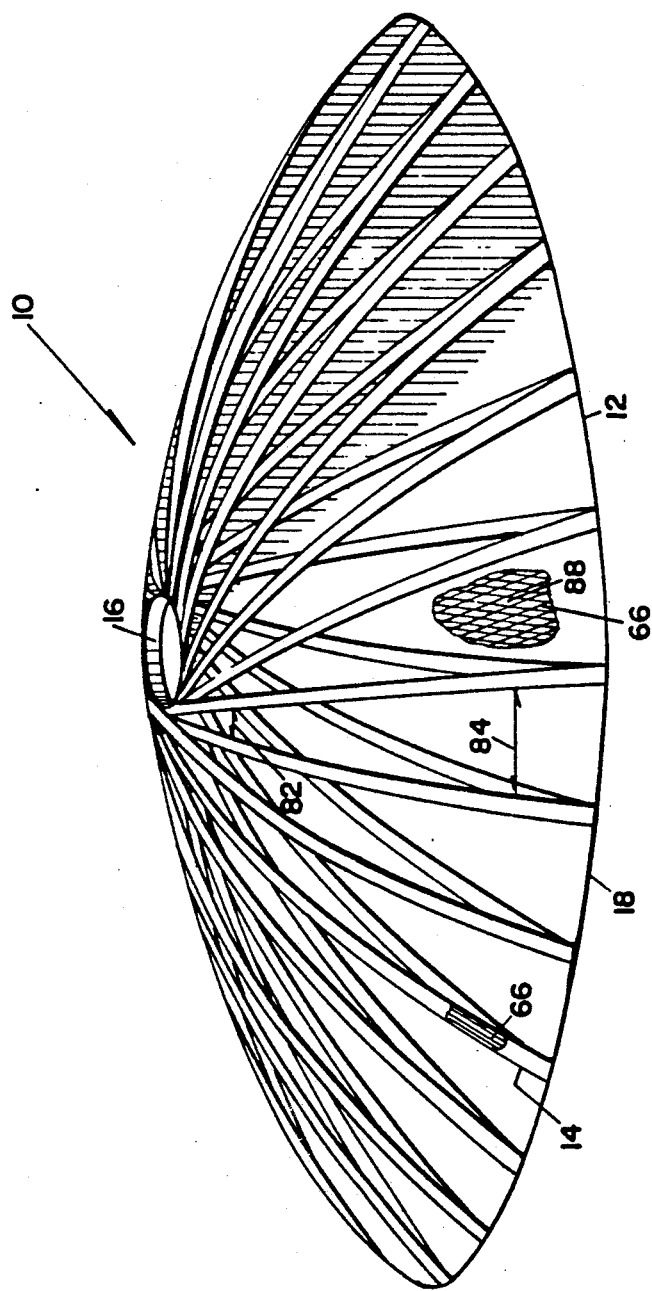
FIG. 1 is a perspective view of a radiation gathering reflector embodying the present invention.

Referring to FIG. 1, there is shown the convex side of a radiation gathering reflector 10 which includes a structural support or backing member or dish 12 composed of fibrous material 66 impregnated with a suitable matrix material such as a resin, illustrated at 88, as will be described hereinafter. Where the term "resin" is used in this specification or the claims, it is to be understood that any other suitable matrix material such as ceramic or metallic in which fibrous material may be embedded is equally applicable. A plurality of isotensoid reinforcements or ribs 14 also of resin impregnated fibrous material 66 extend between the center portion 16 and edge 18 of the support member 12 and cross each other so as to provide diamond-shaped configurations. Such a reflector is usually in the shape of a paraboloid, as shown, since such reflectors are required to gather radiation such as solar energy, microwaves, and radio telescope radiation from long distances However, the reflector may be of any shape which is suitable for a particular radiation gathering function, and such other shapes, for example, shapes provided by ring or parallel line focused systems, are meant to come within the scope of the present invention.

Referring to FIG. 2, there is illustrated a process for manufacturing the reflector 10 shown in FIG. 1. Generally illustrated at 20 is a mandrel, which may be prepared from a machined metal weldment or which may be two machined metal or composite weldments attached together, upon which the support member 12 and a second support member (illustrated at 22 in FIG. 3) are being manufactured. The mandrel 20, which is an oblated spheroid formed by two opposing paraboloid or near paraboloid surfaces of revolution as more fully described hereinafter, is composed of a first portion 24 upon which the support member 12 is formed and a second portion 26 upon which the support member 22 is formed. Each of the mandrel portions 24 and 26 has a convex outer surface bounded by an edge illustrated at 28 and 30 respectively and includes a surface of revolution illustrated at 32 and 34 respectively which has a shape corresponding to a predetermined shape for the inner surface (illustrated at 36 for dish 10 in FIG. 4) of the reflector to be formed The edges 28 and 30 of the mandrel portions, which may be integrally or detachably attached, engage each other at least during winding so that the convex surfaces 32 and 34 together form the exterior surface of the mandrel 20.

The mandrel 20 is rotatable, as illustrated at 40, by means of spindle 38 or other suitable rotating means about its polar axis 42. The term "polar axis" is meant to refer to the axis which is normal to the plane in which each of the edges 28 and 30 lies and which passes through the geometrical centerpoint of each of the edges 28 and 30. The mandrel spindle 38 is supported in position for rotation of the mandrel 20 by support member 44 which also supports a filament winding machine, preferably a polar winding machine as generally illustrated at 46, which holds a delivery head 48 in position for movement of a filament application tip 50, which is positioned at the end of a support 51 which is cantileverly attached to the delivery head 48, in an orbit as illustrated at 52 around the mandrel 20 as it releases or lets out a band 54 of resin or other suitable matrix impregnated fibrous material 66, as will be described more fully hereinafter, which is formed from individual rovings 55 released from spools 56 under suitable tension as provided by tensioners (not shown) in the delivery head 48, to wind the band 54 of resin impregnated filaments about the mandrel 20. The width of the band 54 of rovings 55, which may typically be 1 to 2 inches but may be several inches, is generally a function of the diameter and design parameters. The band 54 of resin impregnated filaments is preferably polar wound (sometimes called "planar winding") about the mandrel 20, i.e., the winding is applied in an orbiting path between the polar regions of the mandrel portions 24 and 26, in order to deliver a greater mass of resin impregnated fibrous material per unit support member surface area at the center portion 16 (near the corresponding mandrel portion pole) and such that the mass per unit of support member surface decreases, generally uniformly, as the distance along the support member surface from the center portion 16 increases so that the support member may have a thin edge portion and therefore require less material, be less expensive, and be of lighter weight, and so that the support member 12 may have adequate strength at the center portion 16 for attachment of various radiation gathering components while the weight per unit area near the edge is nevertheless reduced to a minimum. By "pole" is meant the point on the convex surface of a mandrel portion which is intersected by the polar axis 42. A hole generating spud 58 protrudes typically about an inch or two from the surface 32 at the pole of the mandrel portion 24 to tangentially engage the filament band 54. The spindle member 38, which may terminate at the first portion 26 of the mandrel, serves the same function for the mandrel portion 26. In order to increase the rigidity of the mandrel 20, however, the spindle 38 preferably extends all the way through the mandrel 20 from pole to pole and terminates in a hole generating spud portion. Although a polar winding process has been described, other types of suitable winding processes such as, for example, helical windings wherein the rovings are wound in a spiral pattern are meant to come within the scope of the present invention.

The mandrel 20 is caused to rotate about the polar axis 42 by mandrel spindle 38 at a predetermined speed which is suitably related to the speed at which tip 50 is caused to orbit the mandrel 20 by polar spindle 57 as it releases filament band 54 so as to lay down uniformly over the surface of the mandrel 20 one or more layers of resin impregnated filamentary material 66. The filament band 54 is routed from the spools 56 to the tip 50 by roller guides 60 suitably spaced and geometrically aligned on the delivery head 48 and along the support 51 and is laid onto the mandrel surface from guide roller 62 at tip 50.

An electronic or mechanical or other suitable gear train (not shown) links the mandrel spindle 38 and polar spindle 57 and is preferably computer controlled for coordinating the orbiting and mandrel rotating speeds for uniformly laying the fibrous material as desired for a particular application. The polar winding process and the coordination of the orbiting and mandrel rotating speeds are processes which are commonly known to those of ordinary skill in the art to which this invention pertains and therefore will not be described in any further detail herein.

The use of fibrous material which has been preimpregnated during a separate process is costly and requires a special delivery system to gather and position the rovings to produce the correct band width. Therefore, the resin is preferably applied to the band 54 of fibrous material as it is being laid from guide roller 62. Such a process is schematically illustrated in FIG. 2 by resin supply apparatus illustrated at 64 which is in sealing contact with the surface of guide roller 62 for supplying resin thereto for application to the band 54 of fibrous material at a rate determined by the rate of rotation of the guide roller 62 and therefore in accordance with the rate at which the fibrous band 54 is pulled from the surface of the guide roller 62. Such apparatus 64 and the process for applying the resin are described in detail in U.S. Pat. Nos. 4,561,377 and 4,530,855 to Younqkeit which are hereby incorporated herein by reference for the purpose of showing such apparatus and process.

Referring back to FIG. 1, the support member 12 is formed of windings of fibrous material 66 wherein sufficient suitable polymerizable binder illustrated at 88 or other suitable matrix material is used to bind together the fibers in the windings and to fill any interstices that may exist between any of the windings. The structure preferably is primarily one of fibrous material, i.e., 55 to 70 percent by volume fibrous material, with the quantity of resin being kept to a minimum to bond the strength providing fibers together and to transmit loads to the fibers to thus provide high strength with minimum weight of material.

The band 54 of resin impregnated fibrous material may be laid over the surface of the mandrel 20 in configurations so that windings cross each other, as illustrated by crossing windings 66 of fibrous material in FIG. 1 and similarly as illustrated by the open mesh windings 14 in FIG. 1 which will be described in greater detail hereinafter. Thus, the winding process results in a relatively larger mass of fibrous material at the center portion 16 to provide increased structural support for attachment at the center portion 16 of radiation gathering components and a correspondingly smaller mass of fibrous material along the edge 18 to therefore provide a lighter weight and reduced cost reflector. In other words, the mass of resin impregnated fibrous material per unit of support member surface decreases uniformly as the distance along the support member surface from the center portion 16 increases. Stated another way, referring to FIGS. 3 and 5, the thickness 72 of the support member 12 at the edge 18 is less than its thickness 86 at the center portion 16 and increases uniformly from the edge 18 to the center portion 16. The support member thickness 86 at the center portion may be perhaps 16 times greater than its thickness 72 at the edge.

Where "band of fibrous material" or "fibrous material" are used in this specification or the claims, these terms are by no means limited to fibrous or filamentary material as commonly understood. These materials, in accordance with the present invention, are considered as being filamentary or fibrous whether of the commonly considered circular cross-sectional form or of a flat ribbon-like formation. In this flat formation, they also may fall into the category of what normally may be considered as a band. As contemplated in this application, however, bands, besides being individual elements of ribbon-like form, may be composed of elements formed of a plurality of filaments layed side by side. Thus, the bands or windings 54 forming the support member 12 may be composed of anything from individual filaments of fibrous material in their commonly accepted circular cross-sectional form to bands of ribbon-like form, whether such bands be single integral members or be made up of a plurality of filaments. The type of filamentary material which may be used, in accordance with the present invention, includes, but is not limited to, for example, fiberglass, carbon, graphite, metallic, or aramid roving. Carbon or graphite roving is usually preferred in space applications because this type of roving has a lower coefficient of expansion and contraction and thus lower warpage potential so that better focus for radiation gathering may be provided. However, in many applications, low cost fiberglass roving may be suitable. It should be noted however that the particular fibrous material selected will depend on variables for the particular use of the reflector including the desired characteristics, the price, and workability.

The particular matrix material 88 which will be used will also vary depending upon such variables as the desired characteristics, the price, and workability. The matrix material 88 is preferably an epoxide which has a lesser tendency to warp (shrinks less). Vinylester or other polyester polymers may be suitable for many ordinary uses particularly where precision in use of the finished product is not considered important since they are inexpensive and do not require external heat for polymerization. For uses in space and for other uses where high quality and particularly resistance to UV light, resistance to out-gassing, or resistance to temperature extremes is required, it is preferred that the matrix material 88 be a high temperature cure and performance polymer, i.e., one which has a glassy transition temperature greater than about 400° F. such as, for example, an epoxide manufactured and sold by Ciba Geigy under the trademark Araldite under the designations Araldite MY720 or Araldite MY721, and, even better, such epoxides mixed with bismaleimid. In order to provide good thermal, chemical, and impact resistance, the matrix material 88 is preferably a thermoplastic such as polyether ether keytone.

Referring again to FIG. 1, the stiffening ribs 14 are provided by open mesh winding a plurality of repeating layers of the resin impregnated fibrous material 54. Instead of rotating the mandrel 20 slowly as the winding is applied so that successive windings are laid down adjacent and touching each other to provide the overall thickness (although varying between the center portion and edge as previously discussed) as illustrated at 86 and 72 in FIGS. 3 and 5, during open mesh winding, the mandrel 20 is rotated at a higher rate of speed and the windings 54 are laid down over and over again at spaced repeating paths over the surface of the support member 12. The ribs 14 are provided to strengthen the support member 12 so that the thickness 72 and 86 may be even further minimized to perhaps a thickness 72 which is equal to a single layer of resin impregnated fibrous material which may be perhaps 0 015 inch thick to achieve even lighter weight and reduced cost while still providing a rugged support member 12 of sufficient strength for its purpose.

Referring again to FIG. 1, the winding process as described including the open mesh winding results in a greater structural section modulus and thickness of material near the center portion 16 for support of actuating mechanisms and radiation absorbing components such as energy transducers and the like which are preferably fastened to the central portion 16 of the reflector 10. As a result of the minimized reflector weight due to minimal structural mass near the edges 18, actuating mechanisms for orienting the reflector may be correspondingly smaller and simpler. As illustrated in FIG. 1 at 82 and 84 which represent the distance between adjacent ribs 14 near the center portion 16 and near the edge 18 respectively, the distance 82 is shorter than the distance 84 and decreases uniformly with decreasing distance from the center 16 of the support member 12 to provide relatively greater strength at the center portion 16 and a minimum mass and weight at the edge portion 18. In addition, the windings 54 and ribs 14 are laid to intersect in diamond-shaped configurations, as shown in FIG. 1, to provide, like a geodesic dome, geodestic strength characteristics for increased strength, without any additional material requirement. External reinforcement ribs may also be applied if a support member is made by using an open mesh helical winding.

Referring to FIG. 3 wherein the support members are shown on the mandrel with the spud 58 (shown in FIG. 2) having been removed, after the winding process has been completed and after the resin has polymerized or otherwise hardened by suitable curing as required, the two support members 12 and 22 which are to form the reflectors are separated from each other by forming an equatorial cut in the composite to separate the support members from each other and from the mandrel 20. In accordance with the present invention, any suitable means may be used to make the equatorial cut which is a cut in a plane which is perpendicular to the polar axis 42 and midway between the poles (center portions 16), i.e., along the edges 28 and 30 A preferred cutting means is a tool post grinder illustrated at 70 which includes a diamond or equivalent grit cutting wheel 74 powered by motor 68 which may be, for example, air, electric, or hydraulic driven. The arrow 76 illustrates the pulling of the support members 12 and 22 away from each other and from the mandrel 20. Since the process for forming a reflector out of each of the support members 12 and 22 is the same, only the forming of a reflector 10 out of support member 12 will be described. For purposes of ease of illustration, ribs are not shown on the support members 12 and 22 in FIGS. 3 and 4 although it is understood that the support members 12 and 22 include ribs, as shown at 14 in FIG. 1.

Figure 5:
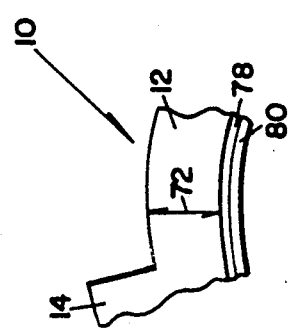
FIG. 5 is an enlarged fragmentary view taken along lines 5—5 of FIG. 4 and illustrating the layers of materials across the thickness of the dish of the reflector of FIG. 4.
Figure 4:
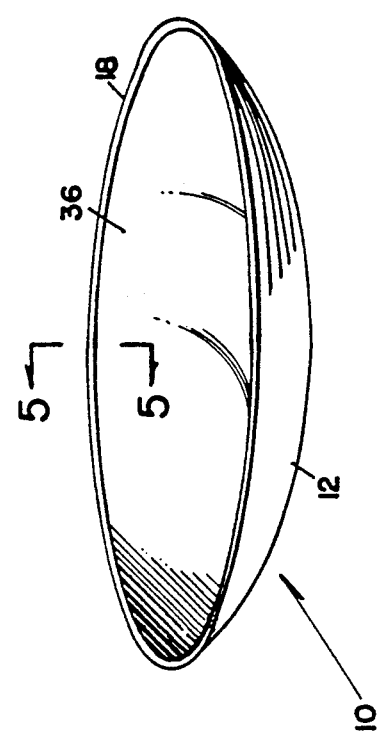
FIG. 4 is a perspective view of the concave surface of one of the dishes of FIG. 3 after a reflective surface has been applied thereto in accordance with the present invention.

Referring to FIGS. 4 and 5, in order to form reflector 10 out of the support member 12, a suitable reflective surface for the desired purpose such as, for example, a mirror surface for gathering lightwaves or a reflective surface for gathering electromagnetic waves, microwaves, or the like is formed on the inner surface of the support member 12 and is illustrated at 78 in FIG. 5. Such a reflective surface 78 is preferably formed on the inner surface of the support member 12 by vapor deposition of reflective metal such as aluminum or preferably gold to provide good reflectivity without wrinkling. The reflective surface 78 may alternatively be provided by the use of a plastic or thin glass material with a metallized reflective surface which has been previously applied by the use of a vacuum forming process. Such a process is commonly known and can be applied by the use of engineering principles commonly known to those or ordinary skill in the art to this invention pertains. The reflective surface 78 is preferably protected by applying a suitable sprayed plastic coating 80, more preferably one such as, for example, polyvinyl chloride, polycarbonate, tedlar, or mylar, which does not require oven curing, to provide toughness, impact resistance, ease of repair, and ultraviolet light resistance.

In order to provide a smooth inner surface to the support member 12 for a high quality product, the mandrel 20 is preferably chrome plated, and the mandrel 20 is preferably polished to a smooth finish and high degree of accuracy and may be treated with a suitable release agent and gell coat before the application of winding.

The above described process of making radiation gathering reflectors is provided to produce light weight reflectors of high accuracy and dimensional stability inexpensively and by the use of automation techniques. After the two support members 12 and 22 are removed from the mandrel 20, the mandrel may then be immediately recycled so that the process may thus be more efficiently automated. Such a reflector may be easily and inexpensively repaired by merely replacing the reflective surface on an undamaged backing member.

In accordance with an alternative embodiment of the process of the present invention, the mandrel 20, which is preferably chrome plated and polished as previously discussed, is first covered with the transparent coating 80, then the reflective surface 78 is vapor deposited or otherwise suitably deposited onto the surface 80, and then the resin impregnated fibrous material 54 is wound over the reflective surface 78 to thus seal the reflective surface 78 between the coating 80 and the composite. The equatorial cut is then made through the composite, reflective surface, and coating after the resin has polymerized to separate the resulting radiation gathering reflectors from each other and from the mandrel 20.

It is to be understood that the invention is by no means limited to the specific embodiments which have been illustrated and described herein, and that various modifications thereof may indeed be made which come within the scope of the present invention as defined by the appended claims. For example, it is envisioned that a low cost light weight reflector for an optical or radio telescope may be provided by a dish such as reflector 10 with a shallow paraboloid shape wherein a zero or low thermal expansion material such as carbon or a graphite tow or roving is used for the fibrous material and, in order to reduce thermal sensitivity, a ceramic matrix material is used. For another example, the dish may be provided with a focal ring instead of a focal point by displacing a centerline of a paraboloid with the cylinder corresponding to the diameter of shadow of the focal gathering and mounting apparatus. For yet another example, it is also envisioned that the process described herein may be applied to the manufacture of trough or channel type reflectors by winding the roving on a double parabolic cylinder including preferably winding a plurality of isotensoid stiffening members or ribs thereon and then dividing the wound cylinder in half. Such modifications are examples of the various modifications which may indeed be made to the present invention which are meant to come within the scope of the present invention as defined by the appended claims.

What is claimed is:

1. A radiation gathering reflector comprises a reflective surface means for gathering radiation, a support member composed of matrix impregnated fibrous material and bonded to said reflective surface means for support thereof, a center portion on said support member, an outer edge portion on said support member, and plurality of ribs composed of the matrix impregnated fibrous material and integral with said support member, each of said ribs extending from said center portion to said edge portion for strengthening the support member, and the distance between adjacent ribs increasing uniformly as the distance from the center portion increases to minimize support member weight and to maximize support member strength at the center portion.

2. A reflector according to claim 1 wherein said ribs cross each other in diamond-shaped configurations and the distance between adjacent said ribs decreases with decreasing distance form said center portion to provide greater strength at the center portion than at the edge portion.

3. A reflector according to claim 2 wherein the support member is made by polar winding matrix impregnated fibrous material on a mandrel which has a pair of opposing surfaces of revolution each of which has a shape corresponding to a predetermined inner reflector surface shape, allowing the matrix to harden to form a composite of matrix impregnated fibrous material including said support member and another support member integrally connected thereto corresponding to the pair of opposing surfaces of revolution respectively, and forming an equatorial cut in the composite after the resin has hardened to separate said support member from said another support member and from the mandrel.

4. A reflector according to claim 2 wherein the mass of matrix impregnated fibrous material per unit of support member surface decreases as the distance along the support member surface from said center portion increases whereby the thickness of the support member is smallest at the outer edge portion and uniformly increases as the distance from the outer edge portion increases.

5. A reflector according to claim 1 wherein the fibrous material is composed of a material selected from the group consisting of carbon and graphite.

6. A reflector according to claim 5 wherein the matrix is composed of a ceramic material.

7. A reflector according to claim 5 wherein the matrix is a polymer which has a glassy transition temperature greater than about 400° F.

8. A reflector according to claim 1 further comprises a transparent protective coating on said reflective surface means.

9. A reflector according to claim 1 wherein the mass of matrix impregnated fibrous material per unit of support member surface decreases as the distance along the support member surface from said center portion increases whereby the thickness of the support member is smallest at the outer edge portion and uniformly increases as the distance from the outer edge portion increases.

10. A radiation gathering reflector comprises a reflective surface means for gathering radiation, a support member composed of matrix impregnated fibrous material and bonded to said reflective surface means for support thereof, a center portion on said support member, an outer edge portion on said support member, and a plurality of ribs composed of the matrix impregnated fibrous material and integral with said support member, each of said ribs extending from said center portion to said edge portion for strengthening the support member, the distance between adjacent ribs increasing uniformly as the distance from the center portion increases to minimize support member weight and to maximize support member strength at the center portion, and wherein the matrix is a polymer which has a glassy transition temperature greater than about 400° F.

11. A reflector according to claim 10 wherein the fibrous material is composed of a material selected from the group consisting of carbon and graphite.

12. A reflector according to claim 10 wherein said ribs cross each other in diamond-shaped configurations.

13. A radiation gathering reflector comprises a reflective surface means for gathering radiation, a support member composed of matrix impregnated fibrous material and bonded to said reflective surface means for support thereof, a center portion on said support member, and an outer edge portion on said support member, the mass of matrix impregnated fibrous material per unit of support member surface decreases as the distance along the support member surface form said center portion increases whereby the thickness of the support member is smallest at the outer edge portion and uniformly increases as the distance from the outer edge portion increases.

14. A reflector according to claim 13 wherein said support member is made by winding matrix impregnated fibrous material on a mandrel which has a pair of opposing surfaces of revolution each of which has a shape corresponding to a predetermined reflector inner surface shape, allowing the matrix to harden to form a composite of matrix impregnated fibrous material including said support member and another support member integrally connected thereto corresponding to the pair of opposing surfaces of revolution respectively, and forming an equatorial cut in the composite after the matrix has hardened to separate said support member from said another support member and from the mandrel.

15. A reflector according to claim 14 wherein said support member is made by polar winding the matrix impregnated fibrous material on the mandrel.

16. A reflector according to claim 13 wherein the matrix is a polymer which has a glassy transition temperature greater than about 400° F.

17. A reflector according to claim 16 wherein the fibrous material is composed of a material selected from the group consisting of carbon and graphite.

18. A reflector according to claim 13 wherein the fibrous material is composed of a material selected from the group consisting of carbon and graphite, and the matrix is composed of a ceramic material.

19. A reflector according to claim 13 further comprises a transparent protective coating on said reflective surface means.

20. A reflector according to claim 13 wherein the fibrous material is composed of a material selected from the group consisting of carbon and graphite.

* * * * *